July 3, 1962
J. R. KIRK
3,042,458
PRELOADED BALL BEARING SEAT SLIDE CONSTRUCTION
Filed Jan. 28, 1959
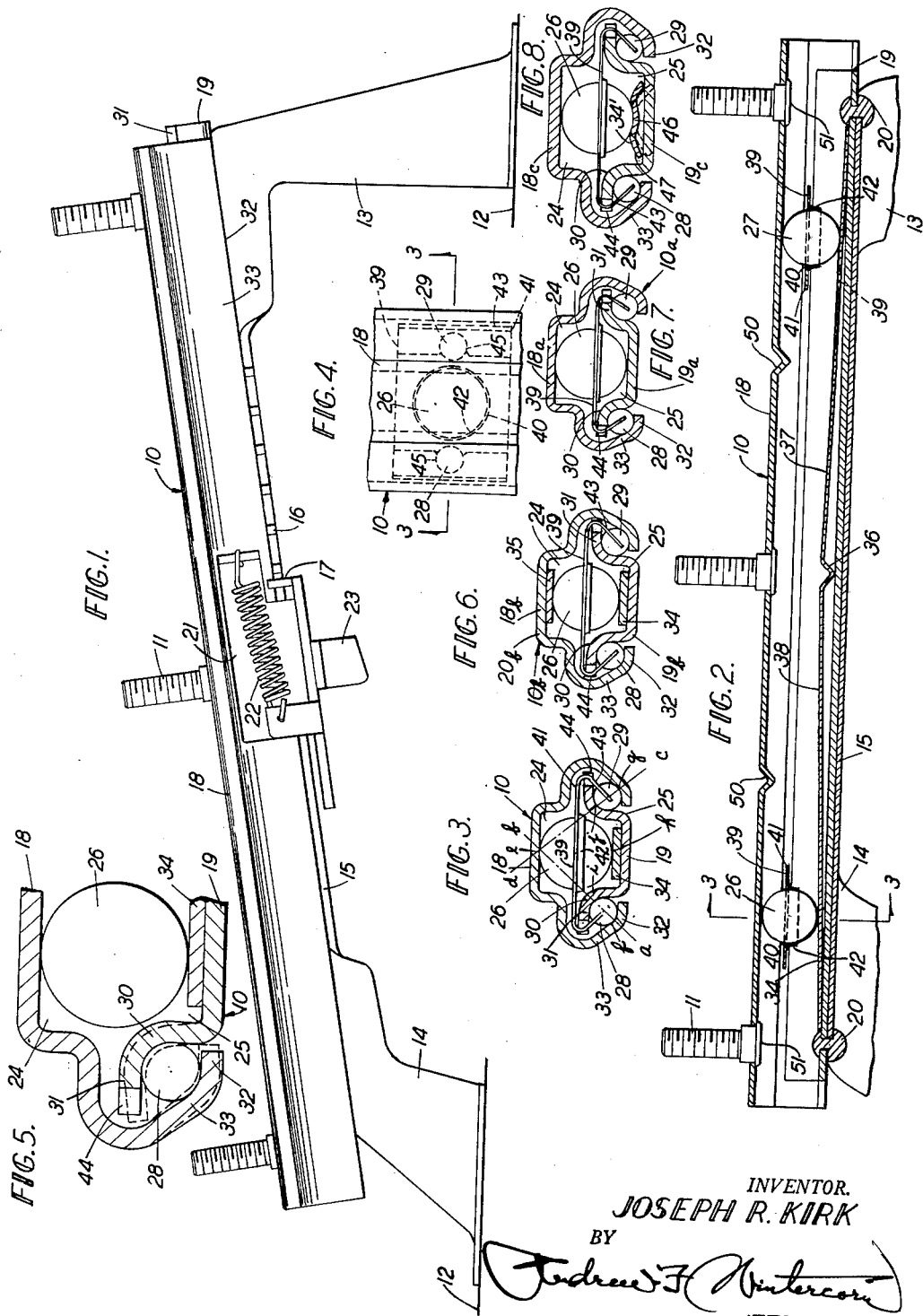
INVENTOR.
JOSEPH R. KIRK
BY
ATTORNEY

United States Patent Office 3,042,458
Patented July 3, 1962

3,042,458
PRELOADED BALL BEARING SEAT SLIDE
CONSTRUCTION
Joseph R. Kirk, Rockford, Ill., assignor to Atwood
Vacuum Machine Company, Rockford, Ill., a corporation of Illinois
Filed Jan. 28, 1959, Ser. No. 789,726
15 Claims. (Cl. 308—3.8)

This invention relates to ball bearing slide structures generally but is herein more particularly concerned with one designed for application to adjustable seats for use in vehicles, such as automobiles.

The principal object of my invention is to provide a preloaded ball bearing slide structure designed to eliminate lateral and vertical chuck or wobble without sacrificing ease and smoothness of operation and without involving any likelihood of the parts tending to bind.

In the present ball bearing slide structure there are preferably two larger balls disposed between the upper and lower channels at opposite ends and retained in a predetermined spaced relation by engagement in holes in retainers that are disposed between the channels and held against endwise displacement with respect to one channel, and adjacent each of these larger balls are two smaller balls disposed in the opposite side portions of the structure in inclined race-ways that are provided between the outwardly projecting flanges on the lower channel and the inwardly projecting flanges on the upper channel, each of the retainers having downwardly and inwardly projecting side flanges in which notches are defined to accommodate the smaller balls to retain the same in place, so that the three balls at each end are kept in coplanar relationship to one another and properly spaced relative to the three balls at the other end to eliminate lateral and vertical chuck or wobble.

The preloading of the ball bearing slide structure is accomplished by utilizing sheet metal channels with the requisite inherent springiness and forcing the balls between the upper and lower channels thereof, causing appreciable deflection of the flanges as they are spread apart to admit the balls, the balls being thereby maintained under a compressive load at all times, thereby further insuring the elimination of lateral and vertical chuck or wobble. In addition, spring means are assembled in the one or the other or both channels in contact with the larger balls, and these spring elements not only serve as tracks for the balls to run on and thereby afford longer wear, but serve also to take up whatever slack might otherwise develop in the structure due to wear.

The invention is illustrated in the accompanying drawing, in which—

FIG. 1 is a side view of a seat slide structure embodying the improvements of my invention;

FIG. 2 is a longitudinal section through the ball bearing slide structure shown in side elevation in FIG. 1;

FIG. 3 is a cross-section on the line 3—3 of FIGS. 2 and 4 on a slightly larger scale, approximately full size;

FIG. 4 is a plan view of FIG. 3;

FIG. 5 is an enlargement of a portion of FIG. 3 illustrating in dotted lines the position before deflection of the flanges to show how much they are spread apart in the entry of the balls in the assembling of the slide structure;

FIGS. 6 and 7 are cross-sections closely similar to FIG. 3, showing two modified or alternative constructions, and FIG. 8 is another cross-section similar to FIG. 3, showing a further modified or alternative construction.

Similar reference numerals are applied to corresponding parts throughout the views.

The seat slide structure embodying the improvements of my invention is indicated generally by the reference numeral 10 in FIGS. 1–5, two of these structures being provided in connection with each seat attached to the bottom of the seat by means of bolts 11, or in any other suitable manner, and secured to and supported upon the floor 12 by means of front and rear legs or brackets 13 and 14. These are herein illustrated as interconnected by a web portion 15, the forward end portion of which is notched on one side, as indicated at 16 in FIG. 1, to form a rack for cooperation with a latch 17 to lock the seat in any one of a plurality of positions of fore and aft adjustment. Each seat slide structure comprises upper and lower longitudinally extending channel members 18 and 19, the upper member 18 carrying the bolts 11 previously mentioned and the lower member 19 being secured in any suitable manner to the web 15 and supporting brackets 13 and 14, as by means of rivets 20. The channels 18 and 19 are straight but it should be understood that the present invention is not limited to use with straight channels, it being applicable also to channels having longitudinal curvature. The latch 17 is in the form of a lever pivotally mounted on a sheet metal bracket 21 suitably secured to one side of the upper member 18 so as to move with the seat in its fore and aft adjustment. A coiled tension spring 22 normally urges the latch 17 in one direction toward locking engagement with the rack 16, and there is a handle 23 projecting laterally from the latch 17 for easy access by the driver sitting on the seat in the driver's position for release of the latch against the action of the spring 22 whenever it is desired to adjust the seat in either direction.

The upper and lower members 18 and 19 are of stamped sheet metal construction like the supporting bracket structure 13—15 for lightness and economy and also strength and rigidity, and are formed to provide opposing channels 24 and 25 therein, in which two bearing balls 26 and 27 operate to maintain the slide members in a normal spaced relationship without however assuming the function of guiding the upper slide member for movement in a straight line relative to the lower slide member 19, this latter function being performed by two smaller bearing balls 28 and 29 cooperating with each of the larger balls 26 and 27. The balls 28 and 29 work in oppositely inclined race-ways, the upper sides of which are defined by the arcuate portions 30 that connect the vertical side walls of the lower channel 19 with the horizontal flanges 31 on the opposite sides thereof, while the lower sides of said race-ways are defined by the arcuate inturned edge portions 32 of the inwardly bent flanges 33 on the opposite sides of the upper channel 18. The lines $ab$ and $cd$ drawn substantially at 45° with respect to a vertical as center lines through the two balls 28 and 29 and their races in FIG. 3 intersect substantially at right angles to one another at the point $e$ where the ball 26 (or 27) has contact on the top thereof with the bottom of the web of the upper channel 18, and these lines indicate the three point contact at $e$, $f$ and $g$ for the three balls in each end portion of the slide structure that forms one force triangle, another opposing force triangle being formed by the other three points , $h$, $i$ and $j$, and the two force triangles together forming a stable force system so that no vertical or lateral chuck or wobble can occur. Prior designs, having the lines $ab$ and $cd$ intersecting at $e$ in a similar way but not inclined substantially at 45° and, therefore, not disposed substantially in right angle relationship to one another, were incapable of giving results comparable to the present invention and had a tendency to bind, whereas with the parts arranged as herein disclosed, there is no tendency to bind, even though no vertical or lateral chuck or wobble is permitted. Now, freedom from lateral and vertical chuck or wobble presupposes no play between the parts and that is assured by preloading, the balls 26, 28 and 29 (as well as balls 27, 28 and 29 at the other end) being forced between the upper and lower channels 18 and 19, causing the flanges 31 and 33 to be deflected to approximately the extent indicated by the dotted line and full line positions of these portions in FIG. 5, the inherent resilience or springiness in the sheet metal employed insuring springback so that the balls are thereafter maintained under a compressive load at all times.

In the preferred form shown in FIGS. 2 and 3 a single leaf spring 34 is provided as a liner or track for the bottom of the lower channel 19 and has a point bearing contact with the bottoms of the larger balls 26 and 27 at *h*. However, the leaf spring 34, as shown in the slide structure 10*a* of FIG. 7, may be omitted and the balls 26 and 27 in that case bear directly on top of the web of the lower channel 19*a* and against the bottom of the web of the upper channel 18*a*. On the other hand, as shown at 10*b* in FIG. 6, leaf springs 34 and 35 may be provided below and above the balls 26 and 27 in channels 19*b* and 18*b*, in which case the balls 26 and 27 bear on these leaf springs 34 and 35 as tracks. Reverting to FIGS. 1 to 3, the leaf spring 34 has a transversely extending downwardly projecting V-shaped hump 36 bent in the middle portion thereof resting on the web of the lower channel 19 so as to support the inner ends of the front and rear half portions 37 and 38 of the leaf spring in elevated relation to the bottom of the channel, these portions being depressed more or less by the balls 26 and 27 in different positions of adjustment of the seat and having abutment at their extremities against the heads of the rivets 20, so that the leaf spring is positively held against endwise displacement with respect to the lower channel 19. While the primary purpose of the leaf spring 34 is to provide upward spring pressure on the balls 26 and 27 it also provides a hardened track surface for these balls to run on, so that there is no danger of too much wear occurring and reducing the effectiveness of the preload to the point where lateral and vertical chuck or wobble might occur and the seat slide might rattle. When only one leaf spring is provided, as in FIG. 3, it may be in the upper or lower channel.

Each of two sets of three balls (26, 28 and 29) (27, 28 and 29) is retained in a single nearly vertical plane by means of a ball retainer 39 made of thin leaf spring material with a large center hole 40 for the larger ball in the rectangular main body portion 41 thereof, the edges of the hole 40 being swedged in one direction, as indicated at 42, to make for easier turning of the ball with respect to the retainer and reduce the likelihood of binding. The opposite end portions 43 of each retainer are bent downwardly and extend through notches 44 provided in the edges of the flanges 31 on the lower channel so that the retainer limits endwise displacement with respect to the lower channel regardless of the amount of fore and aft adjustment of the seat, although the projections 50 and 51 are, in the last analysis, the positive stops limiting endwise displacement. Half-round notches 45 are provided in the ends of the downwardly and inwardly bent end portions 43 of the retainer to receive the balls 28 and 29 so that these balls, like the larger ball 26 (or 27), are also held against endwise displacement with respect to the lower channel 19 regardless of the amount of fore and aft adjustment of the seat.

Referring to FIG. 8, the leaf spring 34′ illustrated cooperates with the larger ball 26 (or 27) similarly as leaf spring 34 in FIGS. 2 and 3 but is of a different character, being arched transversely as shown to provide a longitudinal depression 46 struck on approximately the same radius as the ball to serve as a track therefor lengthwise of the leaf spring, in more or less elevated relationship to the web of the bottom channel 19*c*, on which the opposed longitudinal edge portions 47 of the leaf spring rest. The dotted line positions of these edge portions indicate the normal unloaded condition while the full line positions are assumed when the leaf spring 34′ has been substantially fully loaded as a result of the assemblying of the balls 28 and 29 into their race-ways, similarly as in the other constructions of FIGS. 3, 6 and 7. The advantage gained with this spring 34′ over a flat leaf spring 34 is that, due to the transverse arch, the leaf spring 34′ is comparable to a Belleville washer and applies an upward spring pressure on the balls 26 and 27 that is substantially constant throughout a given range that is well within the requirements of the present structure. Consequently, the leaf spring 34′ compensates fully for whatever slight amount of wear occurs and there is therefore much less likelihood of any chuck or wobble developing in this slide structure, and accordingly much less likelihood of any rattle. It should, of course, be understood that where only a single leaf spring 34′ is provided it may be above or below the balls 26 and 27. Two of these leaf springs 34′ may be provided in opposed relation, similarly as in FIG. 6.

In operation, each seat slide structure is preloaded in the assembling thereof to make it as "tight" as necessary to forestall the likelihood of any chuck or wobble and consequent rattle developing in the use of the seat slide. The preloading is accomplished by the forming of the upper and lower sheet metal channels so that the flanges thereof are at a predetermined initial angle, as indicated in dotted lines in FIG. 5 and when flexed by the forcing of the smaller balls 28 and 29 therebetween load the leaf spring or springs, and, due to the inherent resilience of the sheet metal, the spring-back tendency thereof, plus the tension of the leaf spring or springs is enough to maintain the smaller balls 28 and 29 and the larger balls 26 and 27 under a predetermined compressive load sufficient to eliminate likelihood of chuck or wobble. The wear is so slight that it is never sufficient to allow chuck or wobble throughout the life of the seat slide structure, what little wear there is apt to be being amply compensated for by the leaf spring or springs. With the construction of FIG. 8, where the leaf spring 34′ is arched transversely and functions as a Belleville washer, there is no appreciable reduction in compressive loading of the balls 26–29 even with more than the usual amount of wear. Sufficient lubricant is usually supplied at the time of assembly to last the life of the unit to insure smooth, quiet and easy operation at all times.

It is believed the foregoing description conveys a good understanding of the objects and advantages of my invention. The appended claims have been drawn to cover all legitimate modifications and adaptations.

I claim:

1. A slide structure comprising in combination a pair of parallel, relatively reciprocable, opposed elongated channel members, each channel member having a web and opposed side walls, providing a load bearing surface on the web thereof, at least two longitudinally spaced bearing balls disposed between said channel members of a diameter in relation to the depth of the channels thereof to space the channel members apart and rollably support one of said channel members upon the other by virtue of said balls having point rolling engagement on diametrically opposite sides thereof with said load bearing surfaces provided in said channel members, race-forming flanges projecting laterally from the side walls on one of said channel members, the other channel member having on the side walls thereof laterally projecting flanges with inturned race-forming edge portions the races on which are opposed to the races defined on the aforesaid race-forming flanges on the first mentioned channel member, the races on the two members being located on converging lines inclined from a vertical at approximately 45° that intersect substantially at right angles to one another at one of the aforesaid points of rolling engagement of the bearing balls, and additional bearing balls disposed between said channel members in said races on said converging lines and maintaining said channel members in assembled relation to one another and the first mentioned balls while preventing lateral displacement of said channel members relative to one another.

2. A slide structure as set forth in claim 1 wherein said channel members have substantially flat web portions interconnecting the sides thereof and are made of sheet metal with inherent resilience and the race-forming flanges on the first mentioned channel member and the inturned race-forming edge portions on the flanges of the other channel member are normally disposed with their races in closer spaced relationship than the diameter of the last mentioned balls, whereby when said balls are forced between said races the race-forming parts are spring-loaded to a predetermined extent, maintaining all of said balls under diametrical spring pressure.

3. A slide structure as set forth in claim 1 wherein said channel members have substantially flat web portions interconnecting the sides thereof and the said load bearing surface provided on the web of at least one of said channel members is constituted by the surface of longitudinally bowed elongated flat leaf spring means, said leaf spring means being supported upon the flat web interconnecting the sides of the channel member, said leaf spring means exerting pressure on the first mentioned balls in a direction substantially at right angles to the direction of movement whereby to prevent displacement of said balls from the positions assumed thereby in the movement.

4. A slide structure as set forth in claim 1 wherein said channel members have substantially flat web portions interconnecting the sides thereof and the said load bearing surface provided on the web of at least one of said channel members is constituted by the surface of longitudinally bowed elongated flat leaf spring means, said leaf spring means being supported upon the flat web interconnecting the sides of the channel member, said leaf spring means exerting pressure on the first mentioned balls in a direction substantially at right angles to the direction of movement whereby to prevent displacement of said balls from the positions assumed thereby in the movement, said slide structure further including means preventing endwise displacement of said leaf spring means relative to said channel member.

5. A slide structure as set forth in claim 1 wherein said channel members have substantially flat web portions interconnecting the sides thereof and the said load bearing surface provided on the web of at least one of said channel members is constituted by the surface of longitudinally bowed elongated flat leaf spring means, said leaf spring means being supported upon the flat web interconnecting the sides of the channel member, said leaf spring means exerting pressure on the first mentioned balls in a direction substantially at right angles to the direction of movement whereby to prevent displacement of said balls from the positions assumed thereby in the movement, said slide structure further including means supporting an intermediate portion of said leaf spring between said balls in elevated relation upon said connecting web.

6. A slide structure as set forth in claim 1 wherein said channel members have substantially flat web portions interconnecting the sides thereof and the said load bearing surface provided at the bottom of at least one of said channel members is constituted by the flat surface of the web interconnecting the sides of the channel member.

7. A slide structure as set forth in claim 1 wherein said channel members have substantially flat web portions interconnecting the sides thereof and the said load bearing surface provided on the web of at least one of said channel members is constituted by the surface of longitudinally bowed elongated flat leaf spring means, said leaf spring means being supported upon the flat web interconnecting the sides of the channel member, said leaf spring means exerting pressure on the first mentioned balls in a direction substantially at right angles to the direction of movement whereby to prevent displacement of said balls from the positions assumed thereby in the movement, said channel members being made of sheet metal with inherent resilience and the race-forming flanges on the first mentioned channel member and the inturned race-forming edge portions on the flanges of the other channel member being normally disposed with their races in closer spaced relationship than the diameter of the last mentioned balls, whereby when said balls are forced between said races the race-forming parts are spring-loaded to a predetermined extent, maintaining all of said balls under diametrical spring pressure which is a multiple of the pressure of said leaf spring means.

8. A slide structure as set forth in claim 1 wherein said channel members have substantially flat web portions interconnecting the sides thereof and the said load bearing surface provided on the web of at least one of said channel members is constituted by the surface of longitudinally bowed elongated flat leaf spring means, said leaf spring means being supported upon the flat web interconnecting the sides of the channel member, said leaf spring means exerting pressure on the first mentioned balls in a direction substantially at right angles to the direction of movement whereby to prevent displacement of said balls from the positions assumed thereby in the movement, said slide structure including means preventing endwise displacement of said leaf spring means relative to said channel member, said channel members being made of sheet metal with inherent resilience and the race-forming flanges on the first mentioned channel member and the inturned race-forming edge portions on the flanges of the other channel member being normally disposed with their races in closer spaced relationship than the diameter of the last mentioned balls, whereby when said balls are forced between said races the race-forming parts are spring-loaded to a predetermined extent, maintaining all of said balls under diametrical spring pressure which is a multiple of the pressure of said leaf spring means.

9. A slide structure as set forth in claim 1 wherein said channel members have substantially flat web portions interconnecting the sides thereof and the said load bearing surface provided on the web of at least one of said channel members is constituted by the surface of longitudinally bowed elongated flat leaf spring means, said leaf spring means being supported upon the flat web interconnecting the sides of the channel member, said leaf spring means exerting pressure on the first mentioned balls in a direction substantially at right angles to the direction of movement whereby to prevent displacement of said balls from the positions assumed thereby in the movement, said slide structure further including means supporting an intermediate portion of said leaf spring between said balls in elevated relation upon said connecting web, said channel members being made of sheet metal with inherent resilience and the race-forming flanges on the first mentioned channel member and the inturned race-forming edge portions on the flanges of the other channel member being normally disposed with their races in closer spaced relationship than the diameter of the last mentioned balls, whereby when said balls are forced between said races the race-forming parts are spring-loaded to a predetermined extent, maintaining all of said balls under diametrical spring pressure which is a multiple of the pressure of said leaf spring.

10. A slide structure comprising, in combination, a pair of parallel, relatively reciprocable, opposed elongated channel members, each channel member having a flat web and opposed side walls, providing a load bearing surface on the flat web thereof, at least two longitudinally spaced bearing balls disposed between said channel members of a diameter in relation to the depths of the channels thereof to space the channel members apart and rollably support one of said channel members upon the other by virtue of said balls having point rolling engagement on diametrically opposite sides thereof with said load bearing surfaces provided in said channel members, said balls being also of small diameter in relation to the width of said channels, race-forming flanges projecting laterally from the side walls on one of said channel members, the same having laterally opposed notches provided in the outer edges thereof adjacent each of said balls, a ball retainer for each ball comprising a main body portion having a hole provided therein centrally thereof closely to receive said ball and having opposed angular edge portions projecting through said notches so as to be limited in endwise displacement relative to said channel member while holding the ball centered relative to said channel member, the ends of said edge portions being disposed in spaced relation to the races and having notches provided therein, the other channel member having on the side walls thereof laterally projecting flanges with inturned race-forming edge portions, the races on which are opposed to the races defined on the aforesaid race-forming flanges on the first mentioned channel member, and additional bearing balls received closely in said notches in the ends of said retainer edge portions and disposed between said channel members in said races and maintaining said channel members in assembled relation to one another and the first mentioned balls while preventing lateral displacement of said channel members relative to one another.

11. A slide structure comprising, in combination, a pair of parallel, relatively reciprocable, opposed elongated channel members having webs and opposed side walls, each channel member providing a load bearing surface on the flat web thereof, at least two longitudinally spaced bearing balls disposed between said channel members of a diameter in relation to the depths of the channels thereof to space the channel members apart and rollably support one of said channel members upon the other by virtue of said balls having point rolling engagement on diametrically opposite sides thereof with said load bearing surfaces provided in said channel members, said balls being also of small diameter in relation to the width of said channels, race-forming flanges projecting laterally from the side walls on one of said channel members, the same having laterally opposed notches provided in the outer edges thereof adjacent each of said balls, a ball retainer for each ball comprising a main body portion having a hole provided therein centrally thereof closely to receive said ball and having opposed angular edge portions projecting through said notches so as to be limited in endwise displacement relative to said channel member while holding the ball centered relative to said channel member, the ends of said edge portions being disposed in spaced relation to the races and having notches provided therein, the other channel member having on the side walls thereof laterally projecting flanges with inturned race forming edge portions, the races on which are opposed to the races defined on the adjacent race forming flanges on the first mentioned channel member, the races on the two channel members being located on converging lines that intersect at one of the aforesaid points of rolling engagement of the bearing balls, and additional bearing balls received closely in said notches in the ends of said retainer edge portions and disposed between said channel members in said races on said converging lines and maintaining said channel members in assembled relation to one another and the first mentioned balls while preventing lateral displacement of said channel members relative to one another.

12. A slide structure comprising, in combination, a pair of parallel, relatively reciprocable, opposed elongated channel members, each channel member having a flat web and opposed side walls, providing a load bearing surface on the flat web thereof, at least two longitudinally spaced bearing balls disposed between said channel members of a diameter in relation to the depths of the channels thereof to space the channel members apart and rollably support one of said channel members upon the other by virtue of said balls having point rolling engagement on diametrically opposite sides thereof with said load bearing surfaces provided in said channel members, said balls being also of small diameter in relation to the width of said channels, race-forming flanges projecting laterally from the side walls on one of said channel members, one of said flanges having a notch provided in the outer edge thereof adjacent each of said balls, a ball retainer for each ball comprising a main body portion having a hole provided therein centrally thereof closely to receive said ball and having opposed angular edge portions one of which projects through said notch so as to be limited in endwise displacement relative to said channel member while holding the ball centered relative to said channel member, the ends of said angular edge portions being disposed in spaced relation to the races and having notches provided therein, the other channel member having on the side walls thereof laterally projecting flanges with inturned race-forming edge portions the races on which are opposed to the races defined on the aforesaid race-forming flanges on the first mentioned channel member, and additional bearing balls received closely in said notches in the ends of said retainer edge portions and disposed between said channel members in said races and maintaining said channel members in assembled relation to one another and the first mentioned balls while preventing lateral displacement of said channel members relative to one another.

13. A slide structure comprising, in combination, a pair of parallel, relatively reciprocable, opposed elongated channel members, each channel member having a flat web and opposed side walls, providing a load bearing surface on the flat web thereof, at least two longitudinally spaced bearing balls disposed between said channel members of a diameter in relation to the depths of the channels thereof to space the channel members apart and rollably support one of said channel members upon the other by virtue of said balls having point rolling engagement on diametrically opposite sides thereof with said load bearing surfaces provided in said channel members, said balls being also of small diameter in relation to the width of said channels, race-forming flanges projecting laterally from the side walls on one of said channel members, one of said flanges having a notch provided in the outer edge thereof adjacent each of said balls, a ball retainer for each ball comprising a main body portion having a hole provided therein centrally thereof closely to receive said ball and having opposed angular edge portions one of which projects through said notch so as to be limited in endwise displacement relative to said channel member while holding the ball centered relative to said channel member, the ends of said angular edge portions being disposed in spaced relation to the races and having notches provided therein, the other channel member having on the side walls thereof laterally projecting flanges with inturned race-forming edge portions the races on which are opposed to the races defined on the aforesaid race-forming flanges on the first mentioned channel member, the races on the two members being located on converging lines that intersect at one of the aforesaid points of rolling engagement of the bearing balls, and additional bearing balls received closely in said notches in the ends of said retainer edge portions and disposed between said channel members in said races on said converging lines and maintaining said channel members in assembled relation to one another and the first mentioned balls while preventing lateral displacement of said channel members relative to one another.

14. A slide structure comprising, in combination, a pair of parallel, relatively reciprocable, opposed elongated channel members, each channel member having a flat web and opposed side walls, providing a load bearing surface on the flat web thereof, at least two longitudinally spaced bearing balls disposed between said channel members of a diameter in relation to the depths of the channels thereof to space the channel members apart and rollably support one of said channel members upon the other by virtue of said balls having point rolling engagement on diametrically opposite sides thereof with said load bearing surfaces provided in said channel members, said balls being also of small diameter in relation to the width of said channels, race-forming flanges projecting laterally from the side walls on one of said channel members, the other channel member having on the side walls thereof laterally projecting flanges with inturned race-forming edge portions, the races on which are opposed to the races defined on the aforesaid race-forming flanges on the first-mentioned channel member, a generally U-shaped ball retainer for each ball comprising a main body portion having a hole provided therein, centrally thereof, closely receiving said ball and having opposed angular edge portions projecting between the edges of said race-forming flanges on the first-mentioned channel member and the inturned race-forming edge portions on the other channel member and having notches provided in the ends of said angular edge portions, and additional bearing balls received closely in said notches and disposed between said channel members in said races and maintaining said channel members in assembled relation to one another and the first-mentioned balls, while preventing lateral displacement of said channel members relative to one another.

15. A slide structure as set forth in claim 14 wherein the races on the two channel members are located on converging lines inclined from a vertical at approximately 45° that intersect substantially at right angles to one another at one of the points of rolling engagement of the first-mentioned bearing balls on one of said channel members.

References Cited in the file of this patent
UNITED STATES PATENTS

| | | |
|---|---|---|
| 2,307,305 | Saunders et al. | Jan. 5, 1943 |
| 2,463,220 | Doty | Aug. 7, 1951 |
| 2,612,208 | Rhodes | Sept. 30, 1952 |
| 2,622,940 | Johnson | Dec. 23, 1952 |